United States Patent Office 2,847,110
Patented Aug. 12, 1958

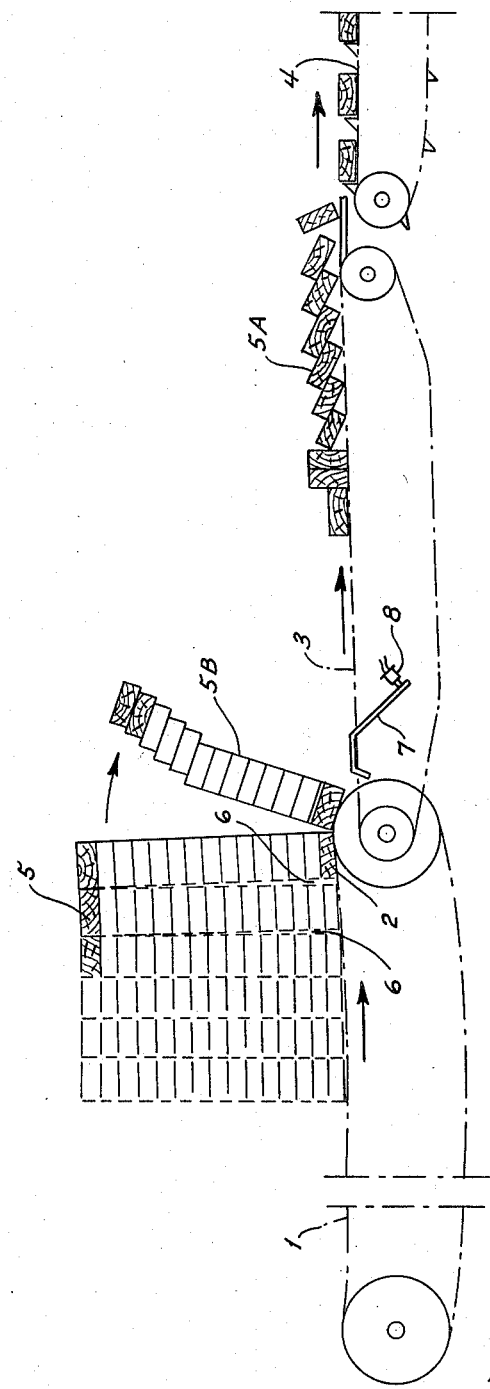

2,847,110

ARRANGEMENT IN CONVEYORS FOR TRANSPORTING PILES OF LUMBER

Alpo Aarne Rysti, Kaukas, Finland, assignor to Oy. Kaukas Ab., Kaukas, Finland, a company of Finland Application June 13, 1957, Serial No. 665,415

3 Claims. (Cl. 198—35)

This invention relates to an arrangement in conveyors for transporting piles of lumber, especially for such transportation where the cross-wise-fed lumber piles are dumped from one transporter onto another for further conveyance of the lumber pieces one by one. If the whole pile or several series of piles are dumped simultaneously onto another conveyor, the lumber pieces will be in complete disorder on top of each other and this hampers the further transfer of the lumber pieces one by one which is usually performed manually. It is an object of the invention to provide a simple and efficient arrangement in conveyors of the above mentioned kind by means of which the dumping of lumber from one conveyor onto another in good order is secured.

The arrangement according to this invention is chiefly characterized by the fact that the conveyor belt or chains of a first conveyor are adapted preferably immediately before delivery end of said conveyor to move along a path directed obliquely upwards to cause the foremost pile of lumber to lean backwards against the following piles, whereby said piles of lumber are forced to fall over onto a second conveyor pile by pile.

According to a preferred embodiment of the invention an automatic control device is provided for example in connection with said second conveyor to be influenced by the lumber pieces carried by said second conveyor in such a manner that a new pile will be dumped onto said second conveyor only after the preceding pile has been transported further.

The invention will be described more in detail in the following with reference to the embodiment shown in the accompanying drawing.

In the drawing 1 designates a conveyor onto which a bundle of lumber 5 is lowered for example by means of a traverse crane or a cable truck or by some other suitable means. The lumber pieces are bundled in piles side by side and the bundle is lowered onto the transporter in such a manner that the lumber moves forward crosswise. After the conveyor 1 a second conveyor 3 is placed on a lower plane and after that a third conveyor 4 furnished with clutches. The lumber piles are dumped from transporter 1 onto transporter 3 from which they are transferred by hand onto transporter 4.

According to the invention the conveyor belts or chains of transporter 1 are adjusted immediately before the dumping point—which is shown by stack 5B just falling over— to move along an obliquely upwards directed path a short distance indicated by 2, for which reason the piles lean backwards as indicated at 6. The result is that the piles fall over one by one in good order, as indicated by the lumber 5A on transporter 3.

According to the invention a pivotally journaled control lever 7 is provided in connection with transporter 3 to affect a switch 8 which in turn controls the driving engine of the transporter 1 in such manner that when the lumber is falling onto transporter 3, lever 7 is affected and transporter 1 stops to start anew when the control lever 7 is freed. In this way several piles of lumber cannot fall over immediately one after the other, in which case the boards would be in disorder on top of each another, and consequently the further conveyance of the boards is not obstructed.

What I claim is:

1. Process for transporting lumber, arranged in successive vertical piles crosswise, from one conveyor onto another, which comprises, transporting the lumber piles along a first substantially horizontal path and immediately prior to the delivery end of said path directing the same obliquely upwards to cause the foremost pile of lumber to lean backwards against the following piles and continuing said transporting to cause said piles to fall onto an adjoining conveyor, pile by pile.

2. Process as in claim 1 and controlling said transporting in response to the position of a pile of lumber already fallen to prevent a subsequent pile from falling until said fallen pile has moved out of the way.

3. Apparatus for transporting lumber arranged in successive vertical piles crosswise from one pile to another which comprises a first conveyor for transporting said lumber, said conveyor having an upwardly inclined portion at the exit end thereof to cause the foremost pile of lumber to lean backwards against the following piles whereby said piles are forced to fall off of the end of said conveyor, pile by pile, a second conveyor positioned to receive said falling piles and a control device positioned for actuation by said lumber on said second conveyor, said control device acting to control the movement of said first conveyor to prevent a subsequent pile from falling onto said second conveyor until the pile thereon has been moved out of the way.

References Cited in the file of this patent

UNITED STATES PATENTS

| | | |
|---|---|---|
| 741,657 | Graham | Oct. 20, 1903 |
| 945,870 | Scovill | Jan. 11, 1910 |